Figure 1:
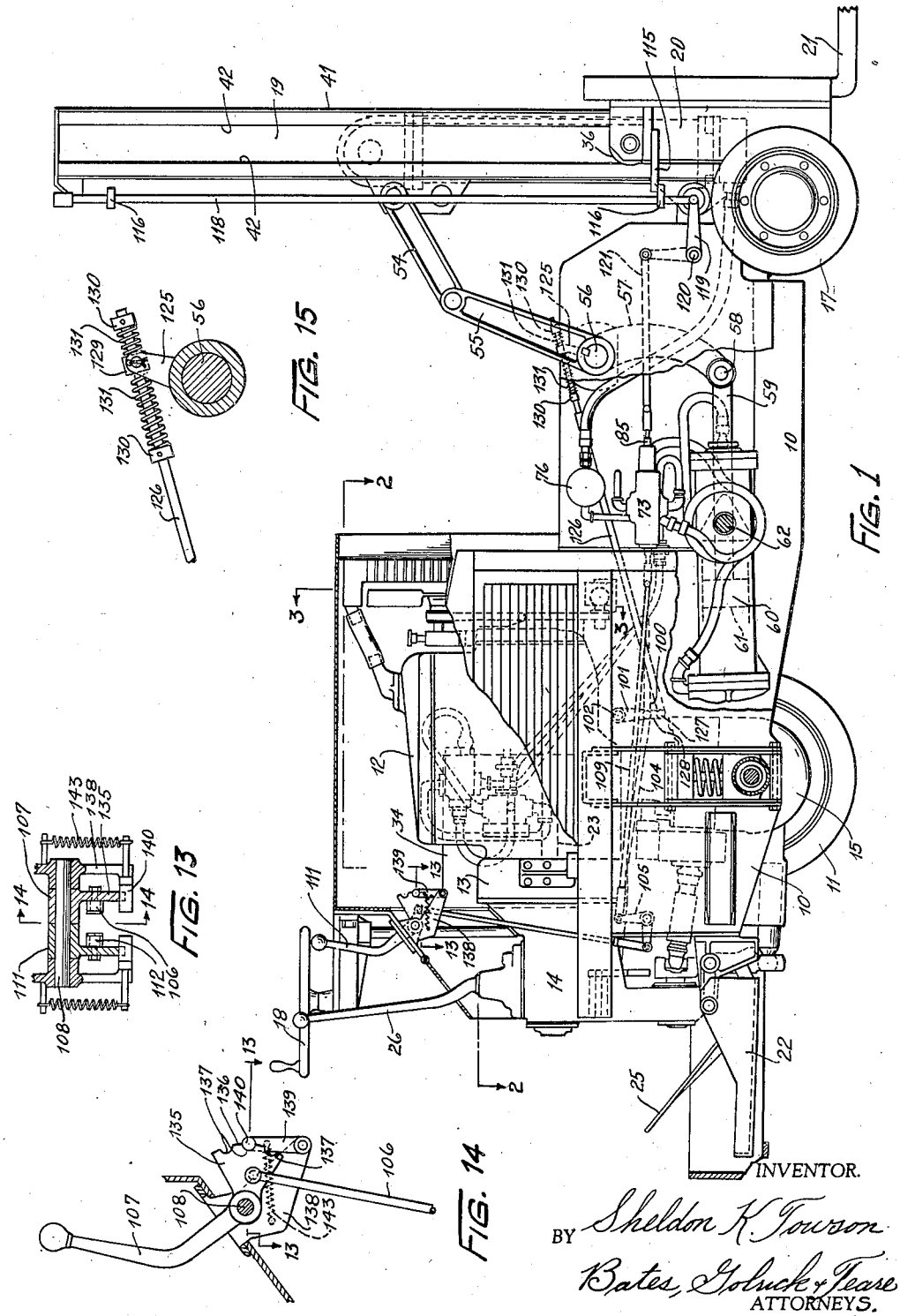

April 12, 1938.  S. K. TOWSON  2,114,157
INDUSTRIAL TRUCK
Filed May 18, 1936  5 Sheets-Sheet 1

INVENTOR.
BY Sheldon K. Towson
Bates, Goluck & Tease
ATTORNEYS.

April 12, 1938. S. K. TOWSON 2,114,157
INDUSTRIAL TRUCK
Filed May 18, 1936 5 Sheets-Sheet 2

INVENTOR.
Sheldon K. Towson
BY Bates, Golrick & Teare
ATTORNEYS.

April 12, 1938.　　　　S. K. TOWSON　　　　2,114,157
INDUSTRIAL TRUCK
Filed May 18, 1936　　　　5 Sheets-Sheet 3

INVENTOR.
Sheldon K. Towson
BY Bates, Goldrick & Teare
ATTORNEYS.

April 12, 1938. S. K. TOWSON 2,114,157
INDUSTRIAL TRUCK
Filed May 18, 1936 5 Sheets-Sheet 4
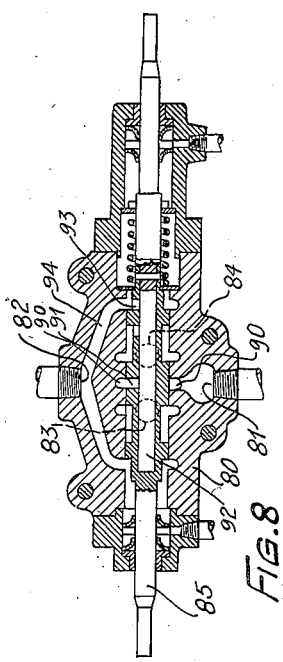
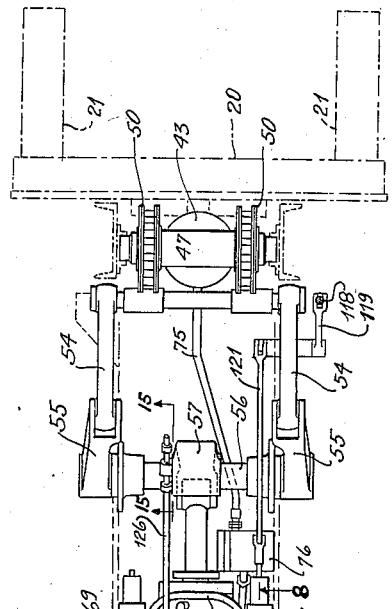
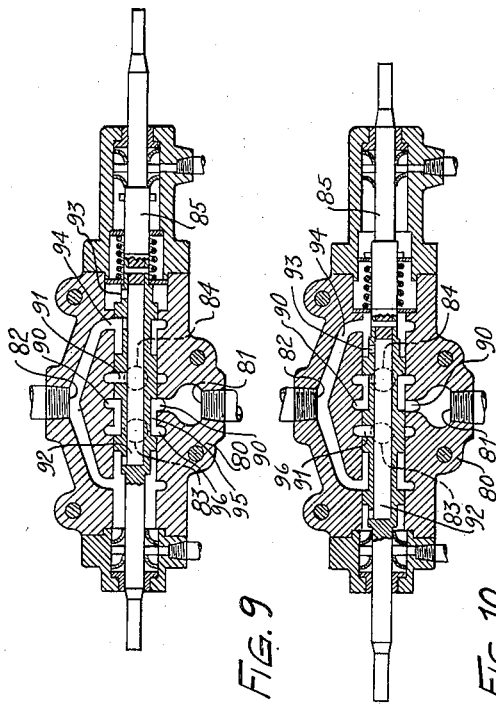
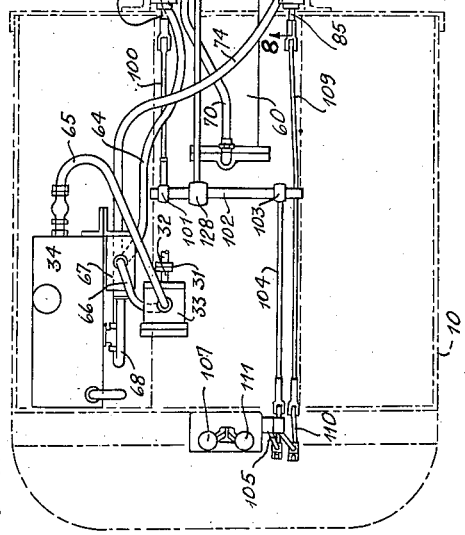
INVENTOR.
Sheldon K. Towson
BY
Bates, Goldrick & Tease
ATTORNEYS.

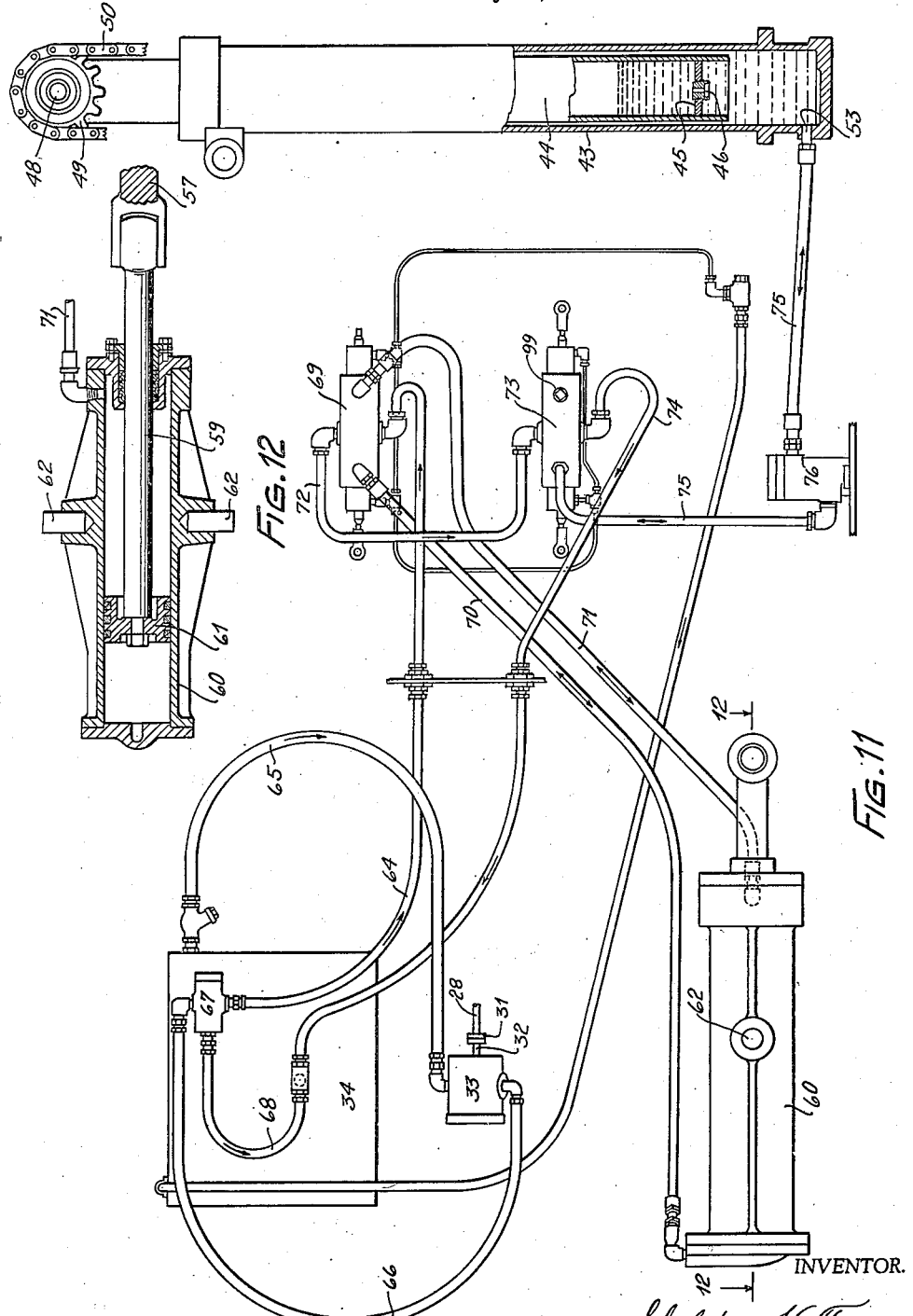

Patented Apr. 12, 1938

2,114,157

UNITED STATES PATENT OFFICE 2,114,157

INDUSTRIAL TRUCK

Sheldon K. Towson, Cleveland Heights, Ohio, assignor to Elwell Parker Electric Company, Cleveland, Ohio, a corporation of Ohio Application May 18, 1936, Serial No. 80,276

11 Claims. (Cl. 214—65)

This invention relates to an industrial tier-lift truck, and especially to an industrial truck having an improved load-handling mechanism arranged to be powered by an internal combustion engine, which is also utilized as a source of motive power for propelling the truck.

Industrial trucks for lifting loads from the truck-supporting surface and transporting such loads from place to place in manufacturing establishments are comparatively well known at the present time. Generally, these trucks comprise a relatively short frame, supporting a power unit at its forward end and having at its rearward end a load-engaging member, such as a platform or load-engaging fork, adapted to be projected beneath a load resting comparatively close to the truck-supporting surface, whereby the load may be raised from the floor and transported to a new location. In the past, industrial trucks, in general were propelled by an electric power unit, comprising a storage battery and suitable electric motors. The storage battery unit was also utilized as a source of power for electric motors which operated the load-handling or lifting mechanisms.

At the present time there is a demand for industrial trucks powered by internal combustion engines. This is due principally to the vast increase in internal combustion engine driven automotive vehicles and the attendant familiarity of the average workmen and mechanics with the operation, repair and maintenance of automotive engines. This has reduced the cost of operation, maintenance and repair of internal combustion engines, in comparison with such cost in respect to electric powered mechanisms. Also, the present high development of ventilation in industrial buildings now permits the use of internal combustion engines in manufacturing plants, where heretofore, such use was prohibitive due to the toxic nature of fumes resulting from the operation of an internal combustion engine. Hence, at the present time internal combustion engines may be advantageously used as a source of power for industrial trucks.

As above mentioned, industrial trucks have been driven by electric motors powered by storage batteries which were also used as a source of power for operating a load-lifting and handling mechanism. When, however, an internal combustion engine, of the automotive type, is substituted for the storage battery and electric motor to propel the industrial truck, a new problem is presented for supplying power to the load-lifting and/or handling mechanism, and it has been found desirable to operate such mechanisms by hydraulic mechanism which is powered by the internal combustion engine, as such units provide a constant source of power despite the intermittent demands and are in many other respects especially well adapted for use in load lifting mechanisms.

The general object of the present invention, therefore, is the provision of an improved industrial lift truck, having an internal combustion type engine as a source of motive power for propelling the truck, and having an hydraulically operated mechanism for lifting or otherwise handling the load with the truck, which mechanism is driven by the engine.

A further object is to provide an industrial truck with one hydraulic mechanism to handle the load as, for instance, to raise or lift the load, and a second hydraulic mechanism to handle the load instance, to tilt or rock the load. More specifically, the present invention is concerned with the arrangement of the above mentioned mechanism whereby one source of hydraulic power will operate both mechanisms either simultaneously or separately and in an efficient and economical manner.

Another object of the present mention is the provision of an improved control mechanism for controlling the hydraulic load-handling mechanism of the truck.

Other objects of the present invention will become more apparent from the following description, reference being had to a preferred embodiment illustrated in the accompanying drawings. The essential and novel features will be summarized in the claims.

Figure 2:
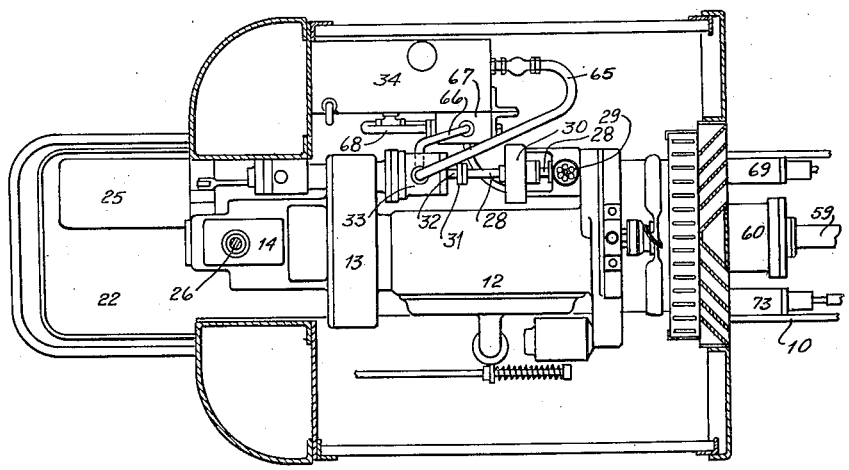
Figure 3:
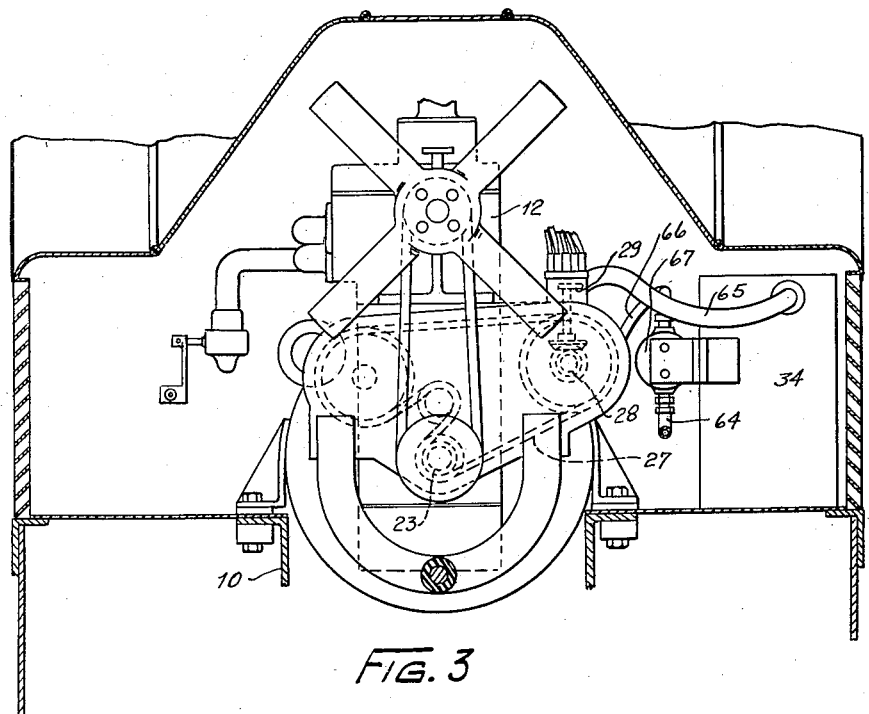
Figure 6:
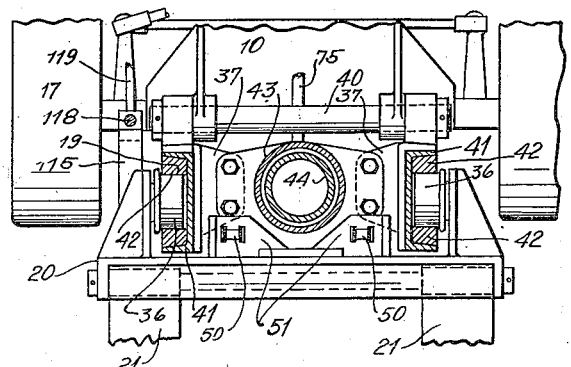
Figure 4:
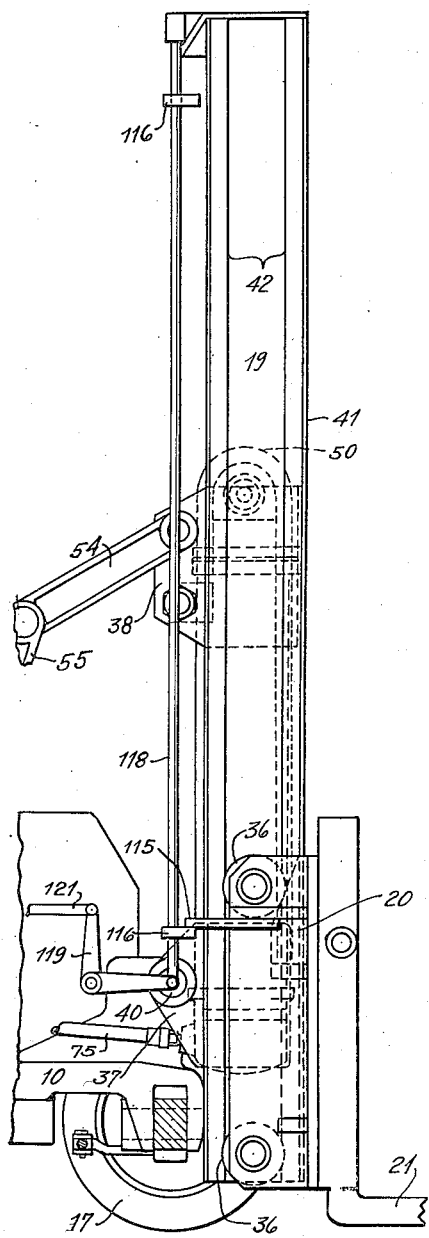
Figure 5:
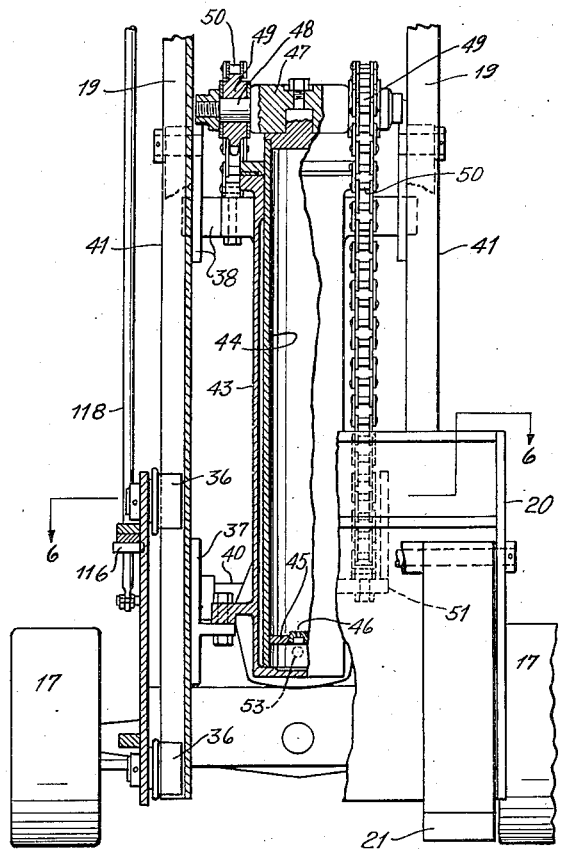

In the drawings, Fig. 1 is a side elevation of an industrial lift truck embodying my invention, certain parts being broken away to more clearly illustrate the internal construction of the structure, Fig. 2 is a fragmentary horizontal section, as indicated by the line 2—2 on Fig. 1; Fig. 3 is a vertical section, taken substantially along the line 3—3 of Fig. 1, and being on a scale somewhat larger than Figs. 1 and 2; Fig. 4 is a fragmentary elevation of the load-handling mechanism; Fig. 5 is a fragmentary front elevation of the truck, certain parts being illustrated in sections to more clearly illustrate the internal construction; Fig. 6 is a fragmentary horizontal section, the plane of the section being indicated by the line 6—6 on Fig. 5; Fig. 7 is a plan view of the hydraulic load-handling mechanism, as illustrated apart from the other details of the truck; Figs. 8, 9 and 10 are sectional detail, of the valve mechanism, for controlling the application of power to the hydraulic cylinder unit, the planes of the section being indicated by the line 8—8 on Fig. 7; Fig. 11 is a diagrammatic illustration of the hydraulic unit of the truck, together with the conduits which interconnect such unit; Fig. 12 is a sectional detail of one of the hydraulic cylinders, the plane of the section being indicated by the line 12—12 on Fig. 11; Fig. 13 is a horizontal section to part of the control mechanism of the truck, the plane of the section being indicated by the lines 13—13 on Figs. 1 and 14; Fig. 14 is a vertical, sectional detail, as indicated by the line 14—14 on Fig. 13; Fig. 15 is a sectional detail of a portion of the control mechanism, the plane of the section being indicated by the line 15—15 on Fig. 7.

Referring again to the drawings, the industrial truck in connection with which I have illustrated my improved load-handling mechanism and the control therefor, comprises a main frame 10, supported at its forward end by a pair of dirigibly arranged driving wheels 11 and carrying an internal combustion motor 12. The motor is connected with the dirigible driving wheels 11 by a clutch mechanism 13, a power-transmission mechanism, indicated generally at 14, and a differential driving unit 15. The driving connections, above mentioned, are more fully shown and described in my copending application, Serial No. 76,372, filed, April 25, 1936. At the rearward end of the truck, the frame is supported by a pair of load-bearing wheels 17. These wheels are likewise preferably dirigibly arranged, both pair of wheels being suitably connected to be controlled by a steering wheel 18.

At the rearward end of the truck, is an upright guideway 19, on which a load-supporting carriage 20 is mounted for vertical movement. This load-supporting carriage may be provided with a platform member, or, as shown, rearwardly extending fork members 21, which are positioned relatively close to the truck-supporting surface and arranged to be projected beneath the load, resting, for instance, on the spaced skid members, and lift the load clear of the truck-supporting surface, to enable such load to be transported from place to place by the truck. The forward end of the truck is provided with an operator's platform 22 and various control members, including the steering wheel, above mentioned.

The motor 12 which is the source of motive power for the truck, is of the internal combustion type, and may be of the type generally found in automotive vehicles. This motor is supported by the main frame 10, with its crank shaft 23 extending longitudinally of the truck, as indicated in Figs. 1 and 3, and is connected at its rearward end with the clutch and transmission mechanism 13 and 14. Suitable mechanisms, such as, for instance, a pedal member 25, and a lever 26, are provided, to control the clutch and transmission mechanisms respectively. A more detailed description of the control mechanism may be had by reference to my copending application, Serial No. 76,373, filed, April 25, 1936.

As illustrated in Figs. 2 and 3, the forward end (left hand in Fig. 1) of the crank shaft 23 is connected by a suitable driving chain 27, with a shaft 28, which extends parallel with the crank shaft 23. This shaft may be the shaft utilized to drive the motor timer mechanism 29 and the water pump 30 of the motor cooling system of the motor. This shaft is driven from the rearward end of the motor by the crank shaft 23 through a drive chain 35 (Fig. 3). As indicated in Fig. 2, the shaft 30 extends forwardly from the pump mechanism and is connected by suitable flexible couplings 31 with a shaft 32, which drives an oil pump 33 adapted to draw oil from a storage reservoir 34 and force it to the load-handling mechanism.

As illustrated in Figs. 1, 4, 5 and 6, the load-handling mechanism with which the present invention is illustrated, includes a lifting mechanism mounted on an upright guideway 19. The latter is pivotally mounted adjacent its lower end on a transversely extending horizontal shaft 40, which is carried in any suitable manner on the main frame 10. This pivotal arrangement of the guideway provides the second load-handling mechanism. The guideway 19 comprises a pair of spaced, oppositely facing channels 41, each provided with trackways 42, which are engaged by rollers 36, carried by the carriage 20, to which is secured a pair of forwardly extending forks 21.

Intermediate the two channels 41, is a vertically extending hydraulic cylinder 43, secured, as shown in Figs. 5 and 6 at its lowermost end to brackets 37 carried by respective channels and secured at its uppermost end by brackets 38, which are likewise secured to respective channels 41.

The cylinder 43 is provided with an elongated hollow piston 44, the lowermost end of which is substantially closed by a transverse disk member 45, provided with a relatively small opening 46. The uppermost end of the piston is closed by a cross-head 47, which extends to either side of the cylinder and is provided with spindles 48 on which are loosely journalled sprockets 49. A pair of drive chains 50, preferably of the roller type are each secured at one end to respective brackets 38 and are looped around respective sprockets 49. The other end of each chain 50 is fixed to respective brackets 51 which are secured to the carriage 20. Thus, when fluid pressure is forced into the cylinder 43, through a suitable opening 53 in the lowermost end of the cylinder, the piston will rise and cause the carriage to rise with it, lifting a load clear of the floor or truck supporting surface. The chamber within the piston provides an air cushion which eliminates shock and supports the load during transit, by supporting the load during transit in a more or less resilient manner, due to the air cushion formed by the air trapped in the upper end of the hollow piston.

As heretofore mentioned the guideway 19 is pivotally connected to the truck frame. This permits the guideway and the load supported thereon to be tilted forwardly toward the motor housing. This tilting enables a load such as sheets of tinplate to be carried by the truck without the use of a clamping mechanism. The tilting also positions the center of gravity of the raised load over the truck chassis and thereby eliminates the use of counterweights which otherwise are used to balance the overhanging load during transit of the truck over rough roadways.

The guideway 19 is tilted by a hydraulic cylinder and piston mechanism 60, 61, illustrated best in Figs. 1 and 7. As there shown, the guideway 19 is pivotally connected by a pair of links 54 to a pair of arms 55 which are secured to a rock shaft 56 journalled in the frame 10. Rigidly secured to the shaft 56 is an arm 57, which is pivotally connected as at 58 with the plunger 59 to which the piston 61 is secured. The cylinder 60, either which the piston moves, is mounted on a horizontal pivot 62. The arrangement is such that as the piston is moved outwardly, that is, toward the right in Fig. 1, the guideway 19 will be rocked forwardly. However, when the piston is moved inwardly the guideway 19 is rocked rearwardly, causing the foremost edges of the forks 21, which are chisel shaped, to engage the truck-supporting surface, so that they may be more readily pushed beneath the load.

The hydraulic cylinders 43 and 60 receive their supply of oil from a continuously operating fluid-pressure pump 33, heretofore mentioned. This pump is preferably connected to the cylinders by metallic conduits and the fluid flow therethrough is controlled by valves hereinafter to be more fully described.

Referring now to Fig. 11, the pump inlet is connected by a conduit 65 with the reservoir 34. The pump outlet is connected by a conduit 66, with a relief valve 67. This valve is of the usual type and arranged to maintain the pressure in the conduit 66 below a certain predetermined maximum. When the pressure rises above such maximum, the valve 67 opens in the usual manner and returns the excess fluid through a conduit 68, to the reservoir 34. The fluid normally passes from the relief valve 67, through a conduit 64, to a control valve 69, which controls the passage of fluid pressure to and from the tilting cylinder.

The valve 69 is so arranged that, when the guideway 19 is being tilted forwardly, the fluid passes from the valve through a conduit 70 into left hand end of the tilting cylinder 60, (Figs. 1 and 11), forcing the piston of such cylinder toward the right, whereupon the fluid between the piston and the right-hand end of such cylinder is returned, under pressure, through a conduit 71 to the valve 69, and through such valve and a conduit 72 to a valve 73, which controls the flow of fluid pressure to the lifting cylinder 43. If the lifting cylinder is idle, the fluid returns from the valve 73 through a conduit 74, into the reservoir 34.

One of the features of my invention is the arrangement of the valve and pressure conduit which enables the operator to tilt and raise the load simultaneously. The valves are so arranged that the full pressure of the pump is supplied to the tilting cylinder. During this tilting operation, the exhaust side of the tilting cylinder 60 is connected through the valve 69 with the valve 73. Hence, all the fluid pressure delivered by the pump, over that required to tilt the load, is applied to the lifting cylinder to raise the load. When, however, the guideway reaches its maximum tilted position the valve 69 is automatically returned to a neutral position as will hereinafter be more fully described. In this setting the valve 69 cuts the flow of fluid in both conduits 70 and 71, and connects the valve 73 directly with the pressure conduit 64, thereby making possible the application of the full pressure of the pump to the lifting cylinder. Such arrangement enables me to use a pump of minimum capacity, to simultaneously both tilt and raise the load and at the same time permit economical operation in that the excess power delivered by the pump during the tilting operation is transmitted to the load-lifting cylinder.

The valves 69 and 73 are substantially identical. Hence, except as hereinafter pointed out, a description of one will suffice for both. The valve 69 is shown in Figs. 8, 9, and 10, and comprises the housing 80, provided with an inlet port 81, an exhaust port 82, and suitable outlet ports 83 and 84, which are connected in various combinations by a slide bar 85.

In Fig. 8, I have shown the valve in its neutral position. The oil from the pump passes directly from the inlet 81 through a passageway 90 in the valve housing, and passageways 91, 92 and 93, in the slidebar 95 to a housing passageway 94 which communicates with the outlet port 82 of the valve. In Fig. 9, I have shown the valve set for tilting the guideway 19 forwardly, that is, toward the motor housing to position the load over the truck frame. The slide bar 85 is at the extreme right of the valve casing 80. The inlet port 81 of the valve communicates through the passageway 90 in the valve housing, with a passageway 95 in the slide bar 85, which passageway bridges between the passageways 90 and 96 in the housing. The latter passageway is in constant communication with the outlet 83 of the valve which is connected by a conduit 70 with the tilting cylinder 60. The opposite end of the tilting cylinder 60 is connected by the conduit 71 with the port 84 of the valve and, through the passageways 91 and 97 in the slide member 85, with the passageway 94. The latter passageway is connected by the conduit 72 with the inlet passageway 81 of the lifting valve 73. Thus it will be seen that during the operation of the lifting valve to tilt the load in one direction, the pressure delivered by the pump 33 in excess of that required to tilt the load may be utilized through the medium of the valve 73 to raise the load relative to the guideway 19.

In Fig. 10, I illustrate the valve 69 in position to tilt the load rearwardly, that is, to cause the load-engaging fork to tilt toward the truck-supporting surface. In this instance, the bar 85 has been moved to the left of the valve housing and the passageway 95 in such bar bridges the intake passageway 81 and the passageway 91 which is in constant communication with the port 84. In this instance, pressure will be applied on the right-hand side of the piston in the cylinder 60 (Fig. 11), and return from the left-hand side of the piston passes through the conduit 70, the passageways 91, 92 and 93 in the slidebar 85, to the passageway 94 in the valve housing which is in communication with the port 82 of the valve. Hence, in this setting of the valve the excess pressure applied to the cylinder 60 is transmitted to the load-lifting control valve 73 and may be utilized to raise the load.

The construction of the valve 73 is identical with the valve 69. The connections however vary. The load-lifting cylinder 43 has but one communicating conduit, namely, the conduit 75, which alternately serves both as a pressure conduit and return or relief conduit, and this conduit is connected with the port 83 of the valve 73. The port 84 of the valve 73 is closed by a suitable plug generally indicated in Fig. 11 at 99. The inlet 81 is connected with the outlet 82 of the valve 69 and the outlet is connected by a conduit 74 with the reservoir 34.

The valves 69 and 73 are arranged for manual control. Such control is best illustrated in Figs. 1, 7 and 13, to 15. As there shown, the slidebar 85 of the valve 69 is connected by a link 100 with an arm 101. This is secured to a rock shaft 102 suitably journalled in the frame and provided with a second arm 103 which is connected by a link 104 with a bell crank 105. The bell crank, in turn, is connected by a link 106 with an operating lever 107, pivotally mounted on a suitable shaft 108, as shown in Fig. 14.

The slide bar 85 of valve 73, which controls the load-lifting cylinder 60 is connected by a link 109 with a bell crank 110, which in turn is connected to an operating lever 111 by a link 112. The lever 111 is pivotally mounted on the shaft 108, heretofore mentioned.

An automatic control is provided for each valve so as to insure the returning of the valve 69 to a neutral position when the guideway 19 has been moved to either of its maximum tilted positions and for returning the valve 73 when the load-lifting carriage has been moved to either of its extreme positions. As shown, in Fig. 1, the load-lifting carriage is provided with a bracket 115, which is arranged to engage one of a pair of lugs 116 secured adjacent the top and bottom respectively of a longitudinally extending bar 118, slidably mounted in brackets carried by the guideway 19. Continued movement of the carriage after the engagement of the bracket 115 with either lugs 116 shifts the bar 118 either upwardly or downwardly, rocking a bell crank 119, pivotally connected to the lower end of the bar and pivoted above a shaft 120 carried by the frame. This bell crank is connected by a pivoted link 121 with the slide bar 85 of the valve 73. The arrangement is such that the valve will be returned to a neutral position, consequent upon the movement of the carriage to either of its extreme positions whereupon movement of the carriage ceases.

The valve 69 is similarly controlled. As shown in Figs. 1, 7 and 15, a lever 125 is rigidly secured to the rock shaft 56 to which the operating arms 55 and 57 are mounted. The arm 125 is provided with a block 129 which slidably engages a rod 126. The rod, as shown in Fig. 1, is pivotally connected as at 127 to an arm 128, secured to the rock shaft 102, heretofore described in connection with the manual control for the valve 69. Adjacent the opposite sides of the arm 125 the rod 126 has secured thereto collars 130, and interposed between these collars and the arm are suitable compression springs 131, which serve the purpose hereinafter to be more fully described. The arrangement is such, however, that when either one of the springs is fully compressed, the arm 125 will act through such compressed spring and the associated collar 130, to move the rod 126, and through the arm 125 the shaft 102, and the links 101, to move the slidebar 85 of the valve 69 to a neutral position, thus stopping the tilting movement of the guideway.

In connection with the automatic release for the valve 69, I have shown a mechanism which prevents the valve from coming to rest intermediate its neutral position and its operative position, that is, intermediate the position shown in Fig. 8, and the position shown in either Figs. 9 or 10. This mechanism is best illustrated in Figs. 1, 13, 14 and 15. As illustrated in Fig. 14, the control lever 107, is provided with an integral arm 135, which has arcuate face 136 interrupted by a series of indentations 137. Pivotally connected to a bracket 138, supported by the frame of the truck, is an arm 139. This arm is provided with a roller 140, which is normally maintained in engagement with one of a plurality of indentations 137 by a spring 143.

The spring 143 is of sufficient strength to maintain the roller in engagement with an indentation 137 until such time as one of the springs 131 (Figs. 1 and 15) is fully compressed, whereupon the arm 125 acts through the fully compressed spring to move the rod 126 forwardly, (or rearwardly as the case may be), thereby raising (or lowering), the rod 106 (Fig. 14), and moving the arm 135 causing the roller 140 to be cammed out of an indentation 137. When, however, the roller has been cammed out of such indentation the power required to rock the lever 107 is decreased to such a point that the force of the fully compressed spring 131 immediately acts on the rod 126 and its associated linkage and rocks the lever 107 until the roller 140 is engaged by another indentation 137.

From the above it will be apparent that I have provided an arrangement whereby the valve 69 cannot become lodged in an intermediate position, thus enabling the use of valve mechanism, wherein the various ports may be separated a distance sufficient to prevent any appreciable loss of fluid pressure, and at the same time eliminating damage which otherwise might exist, due to the valve being locked in a neutral position.

The valve actuating mechanism above described is especially advantageous, in that once the operator moves the control levers 107 and 111, to tilt and raise the load, no further attention to such controls is necessary and the operator may devote his entire attention to the truck propelling mechanism. The manual operation of these controls positions the valve 69 to tilt the load forwardly to a position above the truck chassis and to cause the excess pressure from the relief side of the tilting cylinder to be connected with the valve 73 which has been positioned to raise the load by the operation of the lever 111.

Inasmuch as considerable more power is required, to tilt the load, than is required to raise it, and because the full hydraulic pressure acts on the tilting mechanism and only the excess pressure acts on the raising mechanism, the tilting operation is usually completed some time before the raising operation. The completion of the tilting movement, compresses the spring 131 and moves the valve 69 to a position intermediate its active and neutral positions. In this intermediate position all flow of oil through the valve 69 and hence through the valve 73 is stopped. Obviously the tilting of the load ceases. However, the compression of the spring 131, before the tilting movement stopped, affords sufficient power to continue the movement imparted to the valve 69 by the tilting action and moves the valve 69 to a neutral position. This action is practically instantaneous and positions the valve 69 to conduct the full hydraulic pressure to the raising valve 73. The valve 73 remains in its active position until the load reaches its maximum height, whereupon the adjustable stop acts to move the valve 73 from its active position as heretofore described.

If desired a spring arrangement similar to the spring arrangement 131 may be used in connection with the stop 116, to move the valve 73 from an intermediate to a neutral position. However, I find that it is sometimes desirable to use the construction as illustrated and permit the valve 73 to remain in an intermediate position, whereby the operator must actuate the valve 73 before the load may be returned to its upright position by the tilting mechanism.

From the foregoing description it will be apparent that I have provided an industrial truck utilizing internal compression engine for a source of motive power for the truck and also a source of power for the load engaging mechanism, and I have provided an efficient and economical arrangement of hydraulic power and control therefor for performing two operations, namely, a raising operation and a tilting operation on the load. I have so arranged such mechanism that they may be operated to raise and tilt the load simultaneously or independently.

I claim:

1. In an industrial truck having a frame, driving wheels to support said frame, power operated mechanism to drive said wheels, a source of hydraulic pressure operatively connected to be driven by said power mechanism, a load engaging member, hydraulically operated raising means to raise the load engaging member relative to said frame, hydraulically operable means adapted and arranged to act on the load independently of the raising means, means connecting the source of pressure with both of said hydraulically operable means, said last named means arranged and adapted to apply the full hydraulic pressure to one of said hydraulically operated means and to apply the pressure in excess of that required to operate the last mentioned hydraulic means to the other of said hydraulic means, and selectively operable means to stop such application of pressure and apply the full hydraulic pressure to the last mentioned hydraulic means.

2. In an industrial truck having a frame, driving wheels to support said frame, power operated mechanism to drive said wheels, a pump to supply hydraulic pressure, said pump being driven by said power mechanism, a load engaging member, hydraulically operated raising means to raise the load engaging member relative to said frame, hydraulically operable tilting means to tilt the load engaging member relative to said frame, means connecting the pump with both of said hydraulically operable means, said last named means arranged and adapted to apply the full hydraulic pressure to the tilting means and to apply the pressure in excess of that required to operate the tilting means to the raising means, and selectively operable means to stop the application of pressure to the tilting means and apply the full hydraulic pressure to the raising means.

3. In an industrial truck having a frame, driving wheels to support said frame, power operated mechanism to drive said wheels, a pump to supply hydraulic pressure, said pump being driven by said power mechanism, a load engaging member movably mounted on said frame, hydraulically operated raising means to raise the load engaging member relative to said frame, hydraulically operable tilting means to tilt the load engaging member relative to said frame, means connecting the pump with both of said hydraulically operable means, said last named means arranged and adapted to apply the full hydraulic pressure to the tilting means and to simultaneously apply the pressure in excess of that required to operate the tilting means to the raising means, and means operated automatically consequent upon the tilting of the load a predetermined amount to stop the application of pressure to the tilting means and apply the full hydraulic pressure to the raising means.

4. In an industrial truck having a frame and supporting wheels therefor, the combination with a load engaging member, of hydraulically operated means connected with the load engaging member to raise or lower the same relative to said frame as desired, hydraulically operated means adapted and arranged to act on the load independent of the action of said raising means, said last named means including a cylinder and a piston therein, a source of hydraulic pressure carried by said frame, a valve, a connection between said pump and said valve, said valve being arranged and adapted to be selectively positioned to apply pressure to either of the opposite ends of said piston, a connection between said valve and the raising means, said valve having means whereby when the pressure from the pump is applied to a predetermined end of the piston, the other side of the piston is connected to the load raising means.

5. In an industrial truck having a frame supporting wheels therefor, the combination of an upright guideway pivotally mounted on said frame, a load engaging member mounted for vertical movement on said guideway, hydraulically operated means connected to the load engaging member to raise or lower the same as desired, hydraulically operated means connected to said guideway to rock the guideway about its pivot and thereby tilt the load relative to the frame, said last named means including a cylinder and a piston therein, a power operated hydraulic pump, a valve, a connection between the pump and said valve, said valve including means to connect the pump with either face of said piston as desired, a connection between said valve and the load raising member, said valve having means whereby when the pressure from the pump is applied to one side of the piston, pressure from the other side of the piston is applied to the load raising means.

6. In an industrial truck having a frame supporting wheels therefor, the combination of a normally upright guideway pivotally mounted on said frame, a load engaging member mounted for vertical movement on said guideway, hydraulically operated means carried by said guideway and connected with the load engaging member to selectively raise or lower the same as desired, hydraulically operated means pivotally carried by the truck frame and connected to said guideway to rock the guideway about its pivot and thereby tilt the load relative to the truck frame, said last named means including a cylinder and a piston therein, a power operated hydraulic pump carried by said frame, a valve, a connection between the pump and said valve, said valve including means to connect the cylinder with the pump and selectively apply the pump pressure to either face of said piston as desired, a second valve, a connection between the two valves, a connection between the second valve and the load raising member, said first named valve having means whereby when the pressure from the pump is supplied to one side of said piston pressure from the other side of the piston is connected to the second valve, said second named valve including means to apply such pressure to the load raising means, and wherein said first named valve includes means to cut the connection between the pump and both sides of said piston and to connect the second valve with the pump.

7. An industrial truck having a frame having a wheel supported frame, a power operated hydraulic pump mounted on said frame and connected to be driven by said engine, a normally upright guideway pivotally connected to said truck, a load engaging member mounted for vertical movement on said guideway, hydraulically actuated means carried by said guideway to raise and lower the load engaging member, a cylinder, a piston mounted within said cylinder and intermediate the ends thereof, a connection between the piston and the guideway whereby the guideway is tilted consequent upon movement of the piston relative to said cylinder, a valve, a connection between said valve and said pump, a connection between said valve and the cylinder whereby pressure may be applied to the piston from either end of said cylinder as desired, a connection between said valve and the raising means, a shiftable valve member within said valve arranged to selectively connect either end of said cylinder with the pump and to simultaneously connect the other end of said cylinder with the raising means.

8. In an industrial truck having a wheel supported frame, a power operated hydraulic pump mounted on said frame, a load engaging member movably mounted on the truck frame, hydraulically actuated means to raise the load engaging member relative to said frame, a cylinder, a piston within said cylinder, a connection between the piston and the load engaging member to tilt the load consequent upon movement of the piston relative to said cylinder, a valve, a connection between said valve, and said pump, connections between said valve and the cylinder whereby pressure may be applied to either end of said piston as desired, a second valve, a connection between said valves, a connection between said second valve and the raising means, said valve including means to connect one side of said cylinder with the pump and simultaneously connect the other side of said cylinder with the second named valve, means to connect the second named valve with the first named valve, manually operable means to shift said valves, means acting automatically consequent upon the tilting of the guideway a predetermined amount to sever the connection between the pump and said cylinder and the connection between said valves, resilient means acting automatically consequent upon a predetermined tilt of the guideway to shift the shiftable member of the first named valve to connect the second named valve with the pump.

9. In an industrial truck having a wheeled frame, a power operated hydraulic pump mounted on said frame, an upright guideway pivotally connected to said truck, a load engaging member mounted on said guideway for vertical movement therein, hydraulically actuated means carried by said guideway to raise and lower the load engaging member, a cylinder, a piston within said cylinder, a connection between the piston and the guideway whereby the guideway is tilted consequent upon movement of the piston relative to said cylinder, a valve, a connection between said valve and said pump, connections between said valve and opposite ends of the cylinder whereby pressure may be applied to either end of said piston as desired, a second valve, a connection between said valves, a connection between said second valve and the raising means, a shiftable valve member within the first named valve to connect one side of said cylinder with the second named valve, a shiftable valve member in the second named valve to connect the first named valve with the raising means, manually operable means to shift said valves to such positions, means acting automatically consequent upon the tilting of the guideway a predetermined amount to sever the connection between the pump and said cylinder and the connections between said valves, resilient means adapted and arranged to be compressed by the tilting movement of said guideway, means to retain said resilient means compressed until movement of the guideway ceases and thereupon release said resilient means, said resilient means being connected to the shiftable valve member of the first named valve to position such member to connect the pump with the second named valve, and means acting automatically consequent upon the load engaging member reaching a predetermined point in said guideway to shift the shiftable member of the second named valve, and sever the connection between such valve and the raising means.

10. In an industrial truck, a frame, driving wheels to support said frame, a power driven shaft mounted on said frame and extending longitudinally thereof, means connecting the forward end of said shaft with the driving wheels, a hydraulic pump mounted on said frame and provided with a drive shaft extending longitudinally of said frame, a driving connection between the rearward end of the first-named shaft and the rearward end of the pump shaft, a load engaging member carried at the rearward end of said frame, hydraulically actuated means to raise the load engaging member relative to said frame and a connection between the pump and said last named means.

11. In an industrial truck, having a frame and supporting wheels therefor, a load-engaging member supported by the frame, hydraulic mechanism to raise the load-engaging member, hydraulic mechanism adapted and arranged to act on the load independent of or simultaneously with the raising mechanism, a source of hydraulic pressure, means connecting the source of hydraulic pressure with the hydraulic mechanisms in series with each other and with the source of pressure, and means acting automatically consequent upon the completion of a predetermined operation of one of the hydraulic mechanisms in said series, to disconnect such mechanism from the source of pressure and from the other hydraulic mechanism of the series and to connect the pump directly with such other of hydraulic mechanism.

SHELDON K. TOWSON.